(12) United States Patent
Lefebvre et al.

(10) Patent No.: US 11,578,618 B1
(45) Date of Patent: Feb. 14, 2023

(54) SERVICE TUBE LOCKING DEVICE

(71) Applicant: PRATT & WHITNEY CANADA CORP., Longueuil (CA)

(72) Inventors: Guy Lefebvre, St-Bruno-de-Montarville (CA); Remy Synnott, St-Jean-sur-Richelieu (CA); Philippe Savard, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/657,640

(22) Filed: Apr. 1, 2022

(51) Int. Cl.
| | |
|---|---|
| F01D 25/28 | (2006.01) |
| F01D 25/18 | (2006.01) |
| F01D 25/16 | (2006.01) |
| F01D 9/06 | (2006.01) |
| F01D 9/04 | (2006.01) |
| F01D 25/24 | (2006.01) |

(52) U.S. Cl.
CPC ............... F01D 25/24 (2013.01); F01D 9/06 (2013.01); F01D 25/162 (2013.01); F01D 25/18 (2013.01); F05D 2220/323 (2013.01); F05D 2230/60 (2013.01); F05D 2260/31 (2013.01)

(58) Field of Classification Search
CPC ........ F01D 25/16; F01D 25/162; F01D 25/18; F01D 25/24; F01D 25/28; F01D 9/02; F01D 9/04; F01D 9/041; F01D 9/042; F01D 9/06; F01D 9/065; F05D 2220/323; F05D 2230/60; F05D 2260/30; F05D 2260/31; F05D 2260/98
See application file for complete search history.

(56) References Cited

U.S. PATENT DOCUMENTS

| | | | |
|---|---|---|---|
| 8,641,101 B2 * | 2/2014 | Guclucan | ................... F17D 1/08 285/220 |
| 10,087,847 B2 | 10/2018 | Szymanski | |
| 10,385,710 B2 | 8/2019 | Hendrickson | |
| 11,041,438 B2 | 6/2021 | Agara et al. | |
| 2015/0219015 A1 * | 8/2015 | Szymanski | ............... F02C 7/28 415/208.1 |
| 2018/0073669 A1 * | 3/2018 | Van Den Berg | ...... F16L 27/026 |

* cited by examiner

Primary Examiner — Woody A Lee, Jr.
Assistant Examiner — Elton K Wong
(74) Attorney, Agent, or Firm — Norton Rose Fulbright Canada LLP

(57) ABSTRACT

A service tube assembly comprises a service tube having a threaded end portion and a ratchet hub spaced from the threaded end portion. The threaded end portion of the service tube is threadably engaged with a mating part. The assembly further comprises a locking member having a cantilever extending from a fixed end held relative to the mating part to a free end. A ratchet pawl is provided at the free end for engagement with the ratchet hub on the service tube.

20 Claims, 9 Drawing Sheets

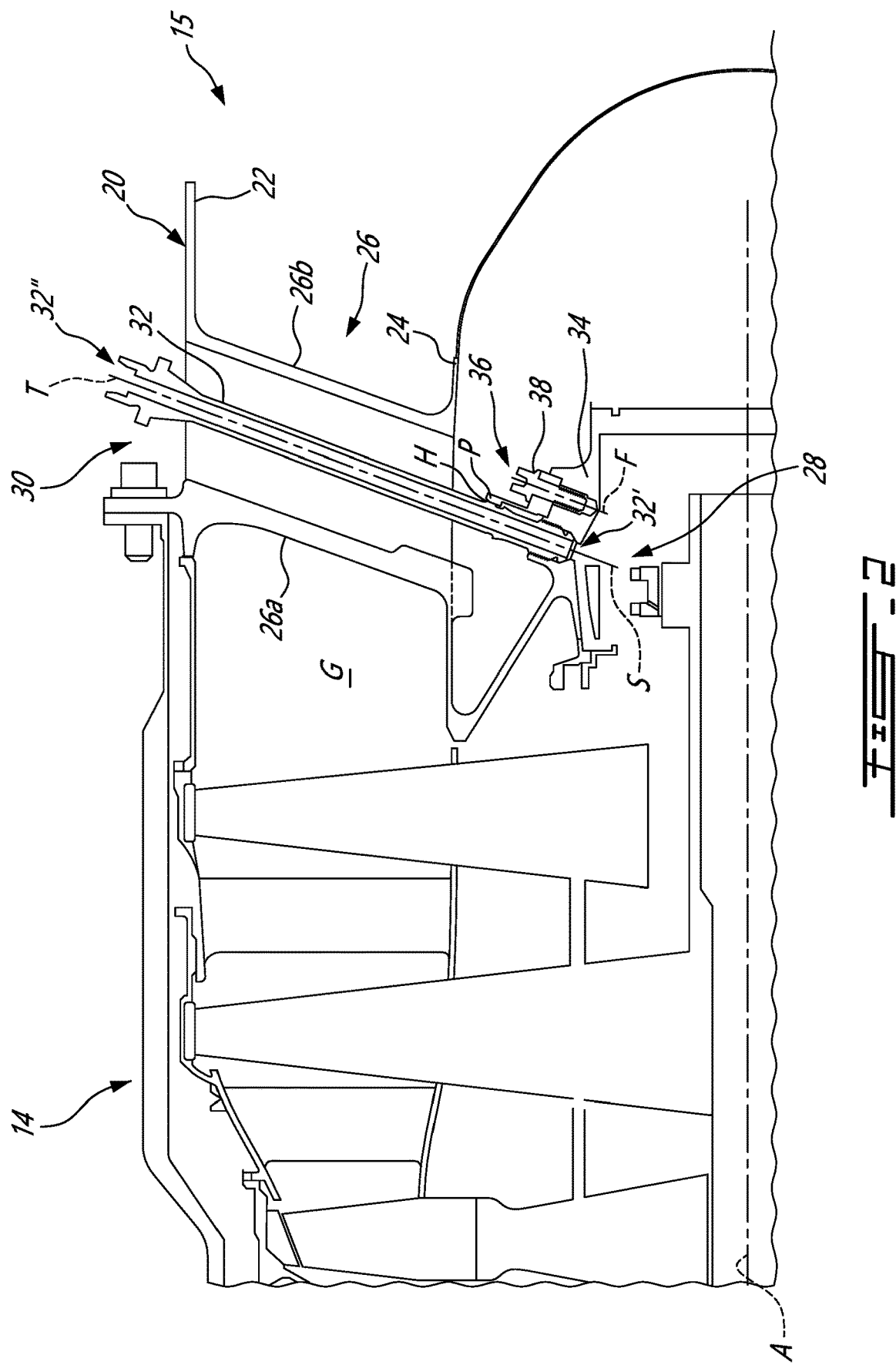

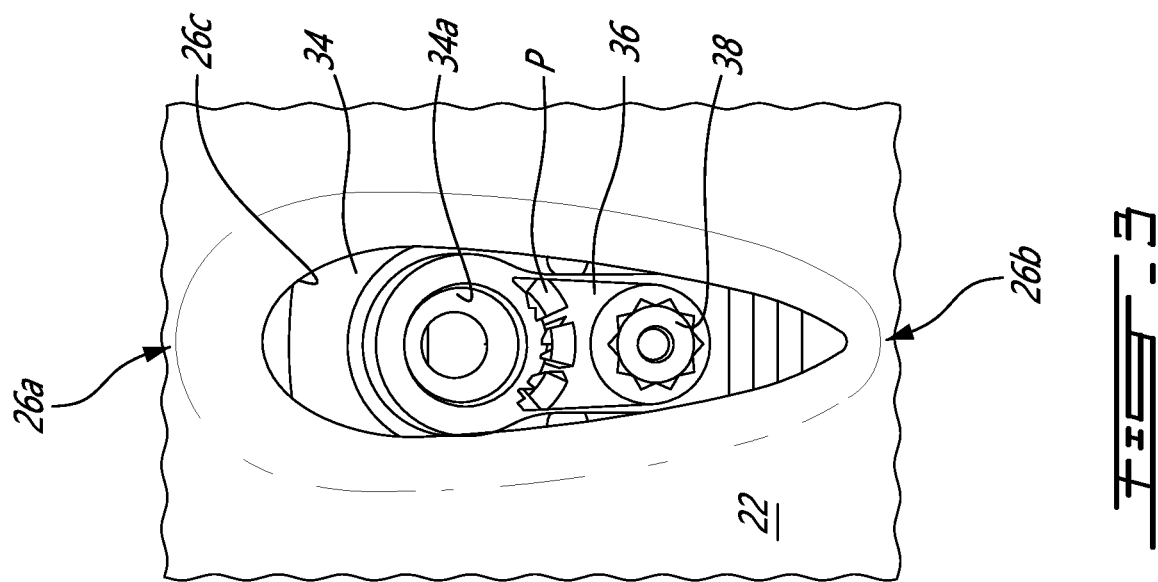

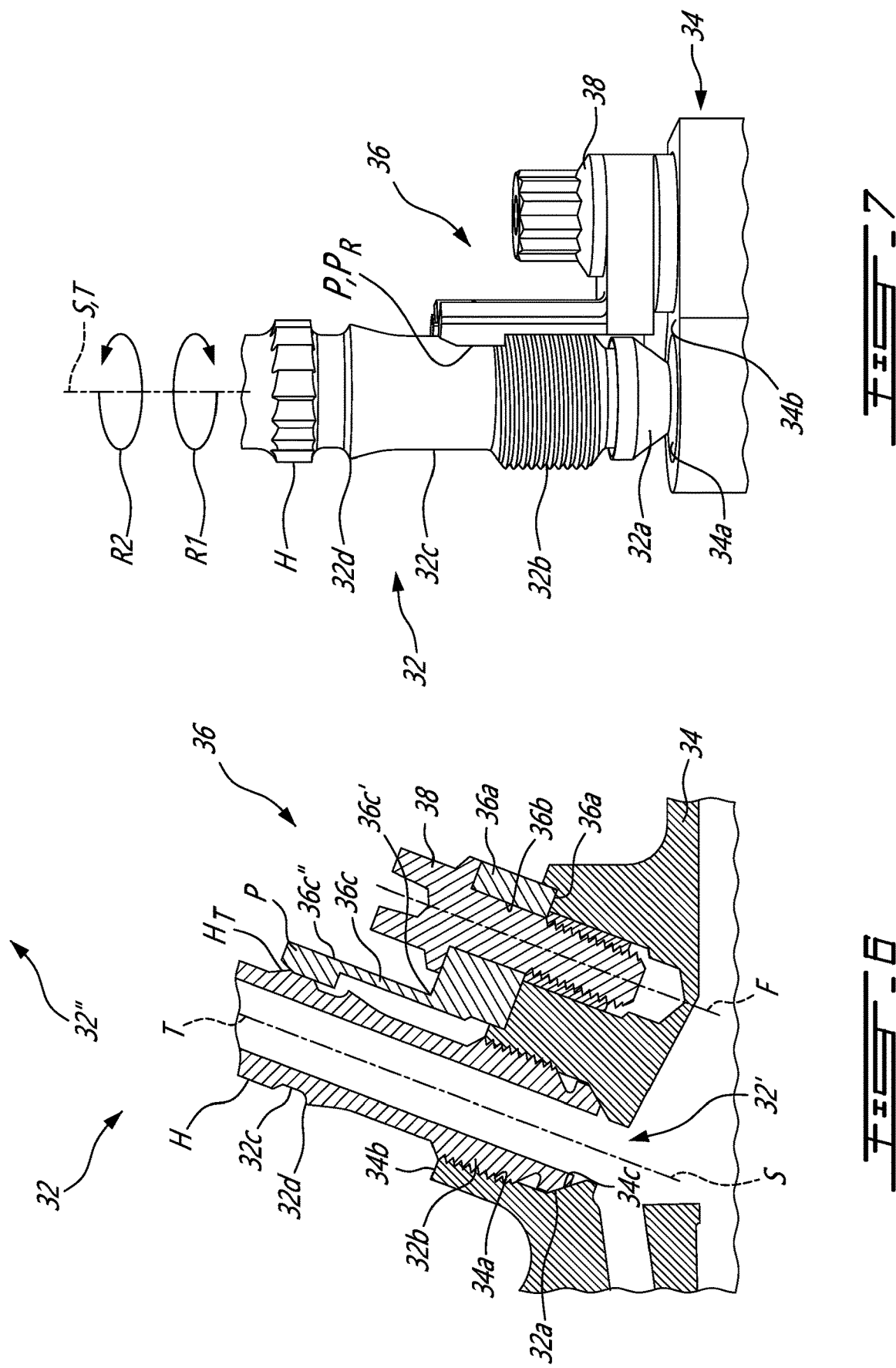

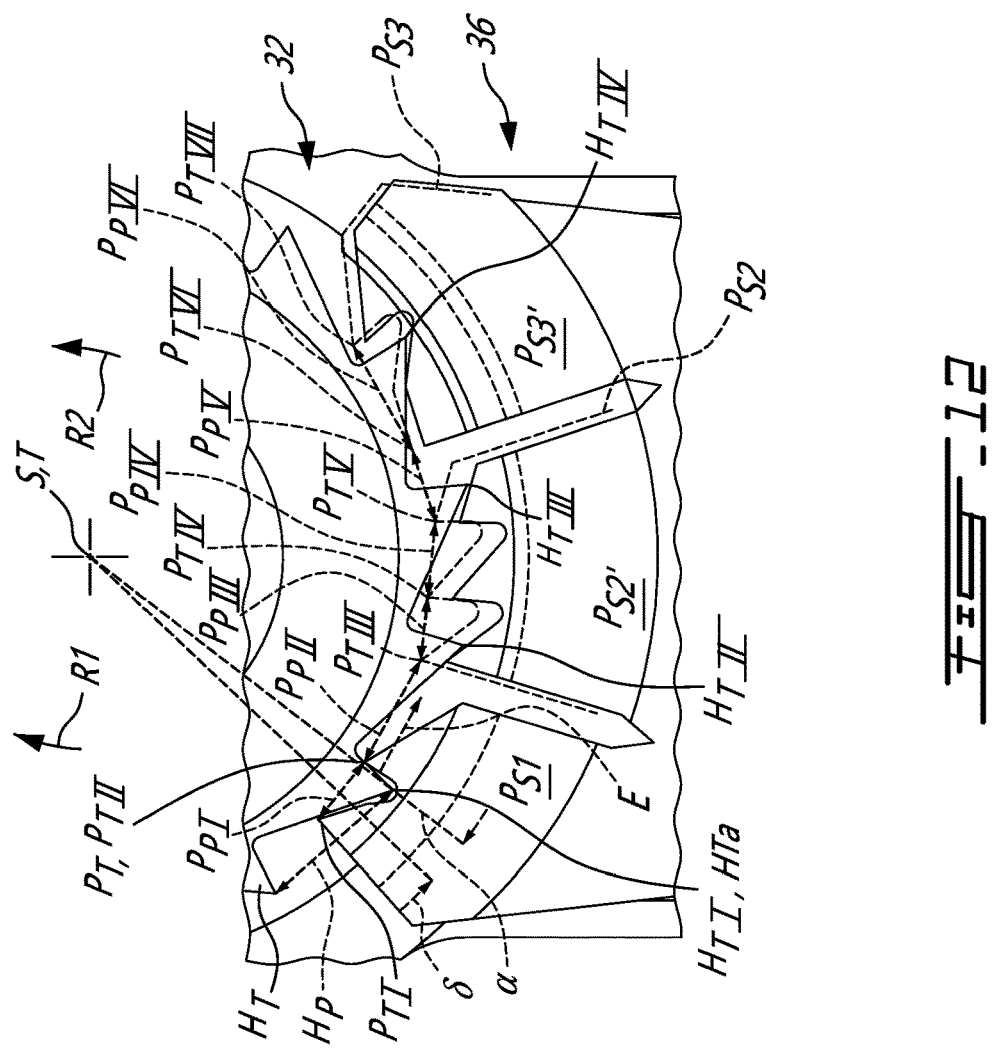
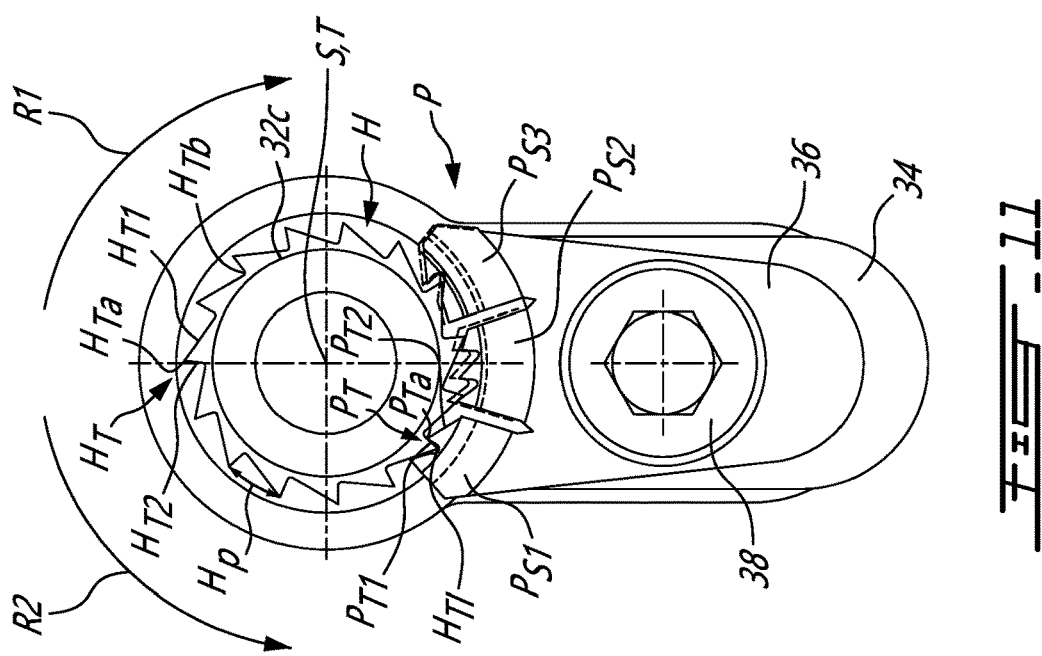

SERVICE TUBE LOCKING DEVICE

TECHNICAL FIELD

The application relates generally to service tubes and, more particularly, to service tube assemblies.

BACKGROUND OF THE ART

Turbine engines include various pipes or tubes therein for directing air, fuel, oil or mixtures thereof to engine components. Threaded connections are often used between such tubes and the associated engine components. However, threaded connections are susceptible to loosening after assembly due to various factors, such as vibrations, impacts, or alternating thermal loads to name a few.

SUMMARY

In accordance with one aspect, there is provided a service tube assembly for an aircraft engine, comprising: a service tube having a threaded end portion and a ratchet hub spaced from the threaded end portion; a mating part having a socket threadably engaged with the threaded end portion of the service tube; and a locking member having a cantilever extending from a fixed end held relative to the mating part proximate to the socket to a free end spaced away from the socket, and a ratchet pawl located at the free end, the ratchet pawl anti-rotationally engaged with the ratchet hub.

In accordance with another aspect, there is provided a turbine exhaust case comprising: an outer duct wall and an inner duct wall defining therebetween an annular gas path about an engine axis; a strut extending across the annular gas path; a service tube extending through the strut, the service tube having a threaded inner end portion and a ratchet hub spaced from the threaded inner end portion; a bearing housing disposed radially inwardly from the inner duct wall, the bearing housing having a socket, the threaded inner end portion of the service tube threadably engaged with the socket, the bearing housing further having a seat located next to the socket; a locking member having a base disposed on the seat, a cantilever extending from a fixed end fixed relative to the base to a free end spaced away from the base, and a ratchet pawl located at the free end, the ratchet pawl anti-rotationally engaged with the ratchet hub; and a threaded fastener releasably holding the base against the seat.

In accordance with a further aspect, there is provided a method of assembling a service tube to an engine component, the method comprising: threadably engaging the service tube with a socket of the engine component, including rotating the service tube in a first handedness relative to the engine component; and locking the service tube against rotation in a second handedness opposite the first handedness relative to the engine component, including catching a ratchet hub of the service tube with a ratchet pawl cantilevered with respect to the engine component away from the socket.

DESCRIPTION OF THE DRAWINGS

Reference is now made to the accompanying figures in which:

FIG. 2 is a schematic cross-section view of a turbine exhaust case of the engine shown in FIG. 1 including a service tube assembly according to an embodiment;

FIG. 3 is a close-up view of a service tube assembly of the turbine exhaust case shown in FIG. 3 shown from across a stud of the turbine exhaust case, with a service tube removed from a remainder of the service tube assembly;

FIG. 6 is a cross-section view of the service tube assembly;

FIG. 7 is an elevation view of the service tube assembly, shown with the service tube in a pre-engagement position relative to the mating part and to the locking member;

FIG. 11 is a top planar view of the service tube assembly of FIG. 10;

FIG. 12 is a close-up view of a ratchet hub of the service tube assembly shown engaged with the ratchet pawl;

DETAILED DESCRIPTION

The description is generally directed to systems, methods, and other devices related to routing fluid flow (e.g. air, oil, fuel or mixtures thereof) in an engine and, more particularly, to systems, methods and devices for securing a threaded connection between a service tube and an associated engine component or mating part. The mating part can be any feature(s) configured for connection to a service tube. For purposes of illustration, the technology will be described with respect to an aircraft gas turbine engine. It will be understood, however, that the technology is not so limited and may have general applicability in non-aircraft applications, such as other mobile applications and non-mobile industrial, commercial, and residential applications, including power generation. Furthermore, even though the following description and accompanying drawings specifically refer to an Auxiliary Power Unit (APU) as an example, it is understood that aspects of the present disclosure may be equally applicable to a wide variety of engines including all types of gas turbine (e.g., continuous combustion) engines, internal (e.g., intermittent) combustion engines, electric powerplants and hybrid powerplants to name a few. It should be further understood that while a particular embodiment is described in reference to a service tube within a strut of a turbine exhaust case, the features of the exemplified service tube assembly could be applied to other service tube assemblies within the engine or along the engine case.

The term "service tube" is herein intended to encompass any tube that can be used in an engine to route a fluid, such as air, oil, air/oil mixture, etc. to an engine component.

The terms "attached", "coupled", "connected" or "engaged" may include both direct attachment, coupling, connection or engagement (in which two components contact each other) and indirect attachment, coupling, connection or engagement (in which at least one additional component is located between the two components).

The terms "substantially" and "generally" as used herein may be applied to modify any quantitative representation which could permissibly vary without resulting in a change in the basic function to which it is related.

Aspects of various embodiments will now be described through reference to the drawings.

Figure 1:
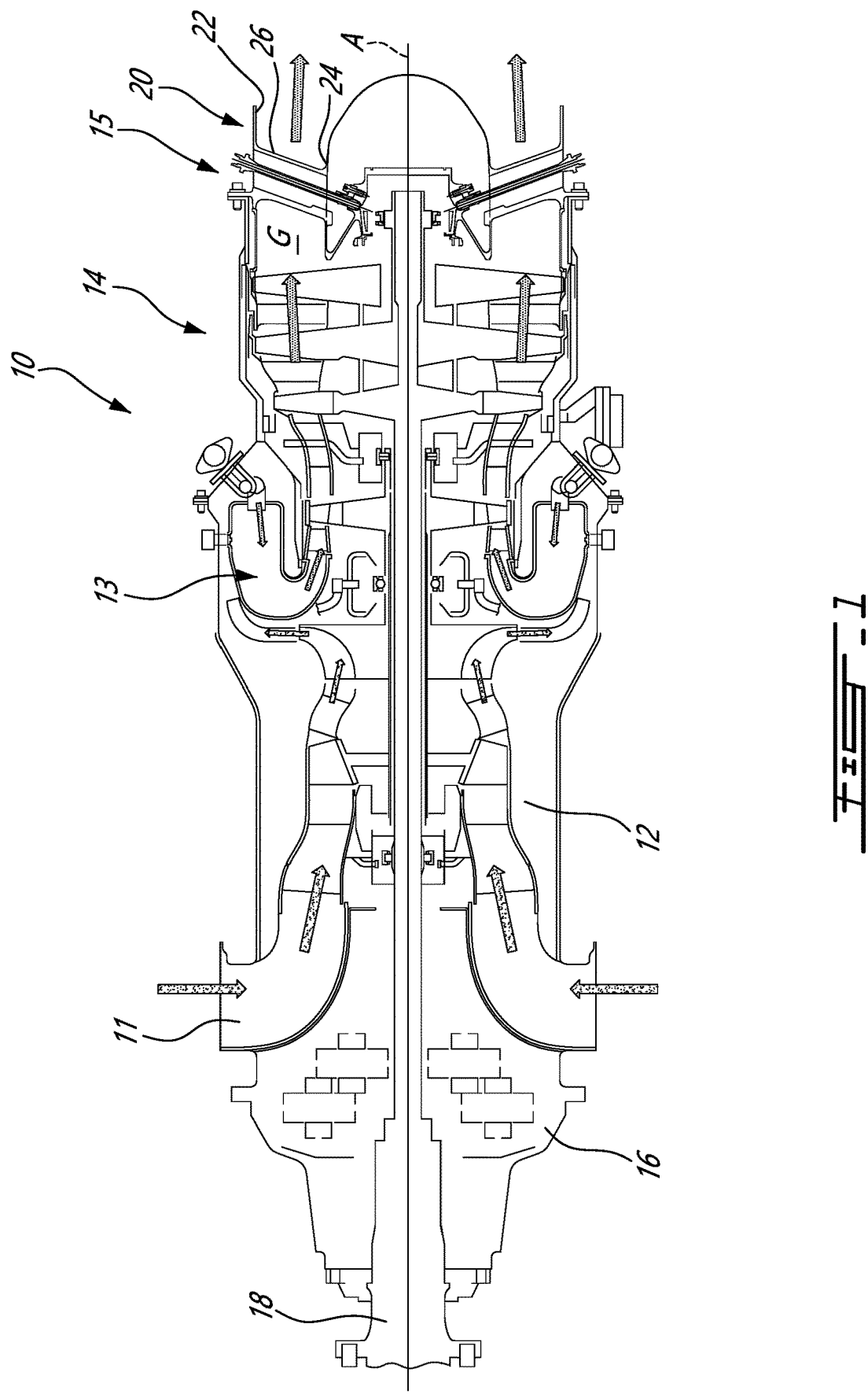
FIG. 1 is a schematic cross section view of a gas turbine engine.

FIG. 1 illustrates a gas turbine engine 10 suitable for use as an APU and generally comprising in serial flow communication an air inlet 11, a compressor 12 for pressurizing the air from the air inlet 11, a combustor 13 in which the compressed air is mixed with fuel and ignited for generating an annular stream of hot combustion gases, a turbine 14 for extracting energy from the combustion gases, and an exhaust 15 through which the combustion gases exit the engine 10. According to the illustrated exemplary engine, the turbine 14 is drivingly connected to an input end of a reduction gearbox (RGB) 16. The RGB 16 has an output end drivingly connected to an output shaft 18 configured to drive a rotatable load, such as a generator (not shown).

Turning to FIG. 2, it can be seen that the exhaust 15 comprises a turbine exhaust case 20 having an outer duct wall 22 and an inner duct wall 24 defining therebetween an annular gas path G extending about an engine axis A. The exhaust case 20 further comprises a plurality of struts 26 circumferentially interspaced from one another and extending generally radially across the annular gas path G from the outer duct wall 22 to the inner duct wall 24, thereby structurally interconnecting the outer and inner duct walls 22, 24. The struts 26 can have an airfoil profile for directing the exhaust gases received from the turbine 14. The struts can thus have a leading edge 26a and a trailing edge 26b. A service tube assembly 30 can be disposed in a hollow interior of one or more of the struts 26 for feeding a service fluid, such as air, oil or an oil/air medium, to an engine component disposed radially inwardly of the gas path G. According to the illustrated embodiment, the service tube assembly 30 is used to provide oil to a bearing 28 mounted inside the exhaust case 15 for supporting an aft end of a main rotor of the engine 10 (e.g. the aft end of a low pressure spool).

Referring jointly to FIGS. 2 to 6, it can be appreciated that the service tube assembly 30 generally comprises a service tube 32 and a mating part 34, herein provided in the form of a bearing housing supporting the bearing 28. The service tube 32 has a tip 32a and a threaded end portion 32b located proximate to the tip 32a and threadedly engaged in a corresponding threaded bore 34a (hereinafter "socket" 34a) defined in an outer surface 34b of the mating part 34. The socket 34a may be a straight-walled bore provided with a suitable threaded insert. The service tube 32 is tightened to a predetermined torque to compress the tip 32a in sealing engagement with a corresponding sealing surface 34c circumscribing an inner end portion of the threaded bore 34a in the mating part 34. In certain implementations, a seal may be placed between the tip 32a and the sealing surface 34c. The socket 34a extends circumferentially about a socket axis S, and engagement of the threaded end portion 32b with the socket 34a causes the service tube 32 to align with the socket axis S. Over time, such a threaded connection may become loose, which may result in oil leakage at the service tube 32 and mating part 34 interface.

It is herein proposed to provide the service tube assembly 30 with an anti-loosening or locking structure to hold the service tube 32 in place after the same has been fastened to a specified torque. The anti-loosening structure generally comprises a locking member 36 interfacing between the service tube 32 and the mating part 34 at a location near the threaded engagement therebetween to lock the service tube 32 insofar as rotational loosening relative to the mating part 34 is prevented. As will be described in greater detail hereinbelow, the service tube 32 and the locking member 36 are respectively provided with a ratchet hub H and a ratchet pawl P that are engageable with one another such that rotation of the service tube 32 about the socket axis S is allowed in a first direction, and hindered in a second direction opposite to the first direction. As best seen in FIG. 2, the hub H (when the threaded end portion 32b of the service tube 32 is engaged with the socket 34a) and the pawl P are located proximate to the mating part 34 and in particular radially inward of the inner duct wall 24 of the exhaust case 20 relative to the axis A. By this arrangement, the anti-loosening structure is spaced, and thus thermally-insulated, from annular gas path G and its associated high-temperature conditions, rendering the hub H and the pawl P sufficiently dimensionally stable, which may desirably affect the reliability of their engagement.

Figure 5:
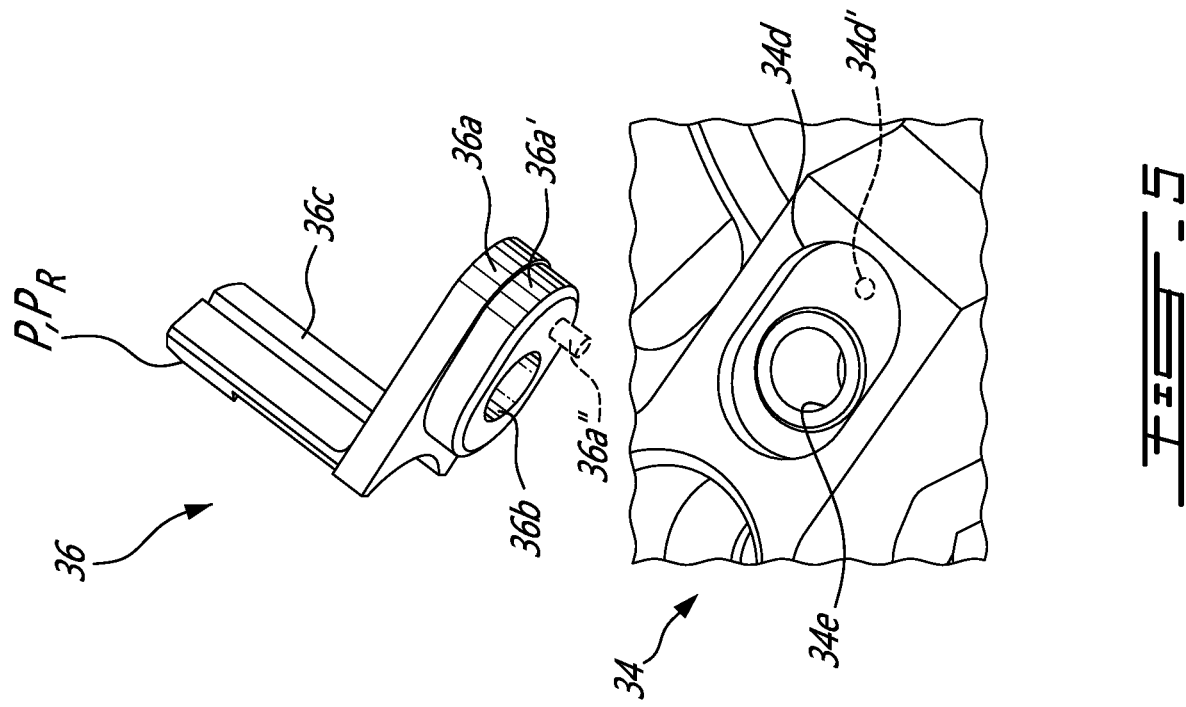
FIG. 5 is an exploded view of a locking member and of a mating part of the service tube assembly.
Figure 4:
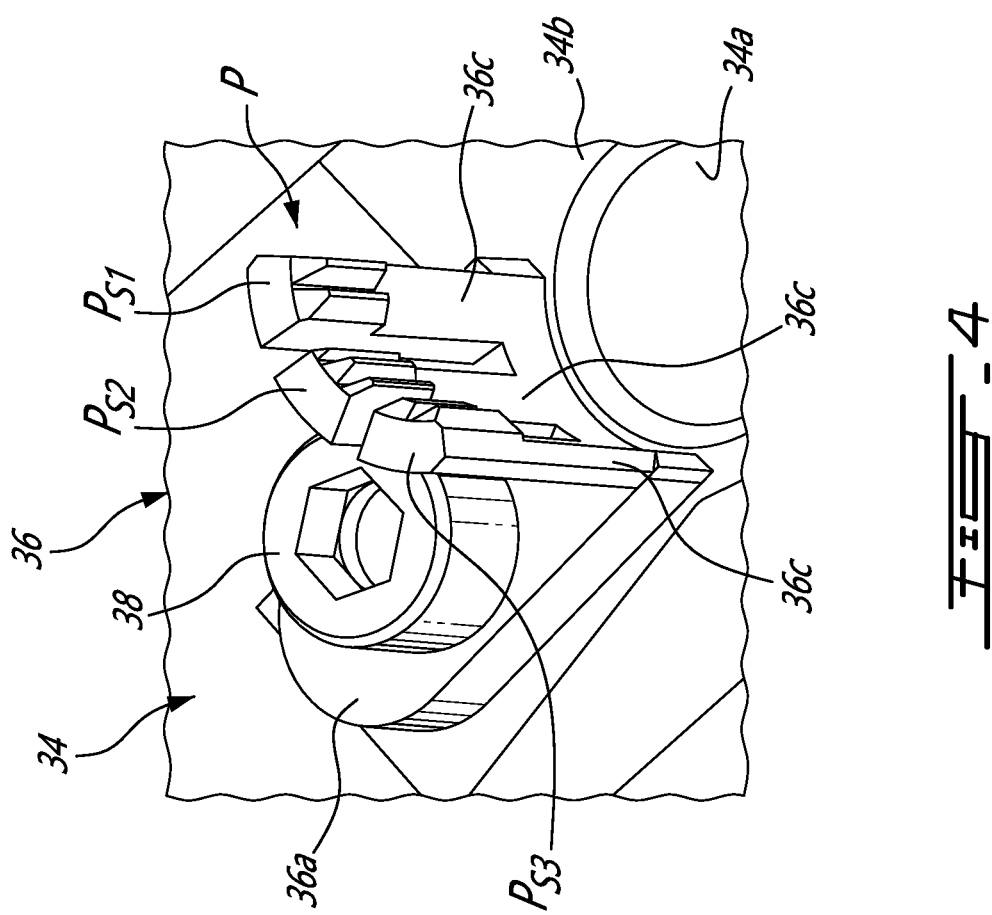
FIG. 4 is an isometric view of the remainder of the service tube assembly.
Figure 10:
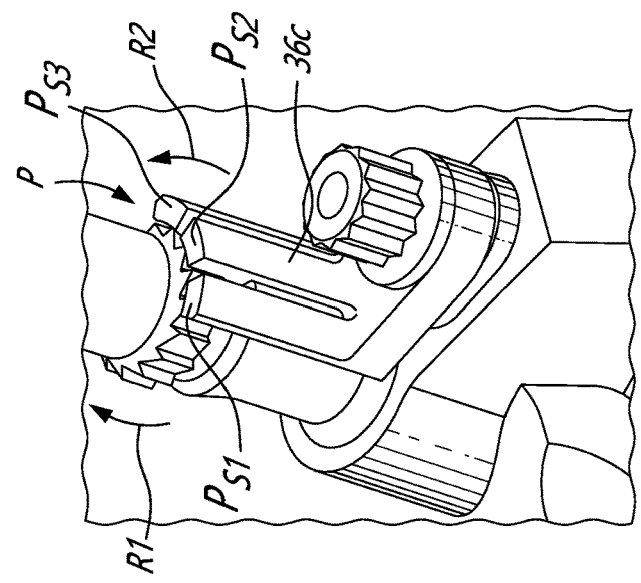
FIG. 10 is a perspective view of the service tube assembly, shown with the service tube engaged relative to the mating part and engaged relative to the locking member.
Figure 9:
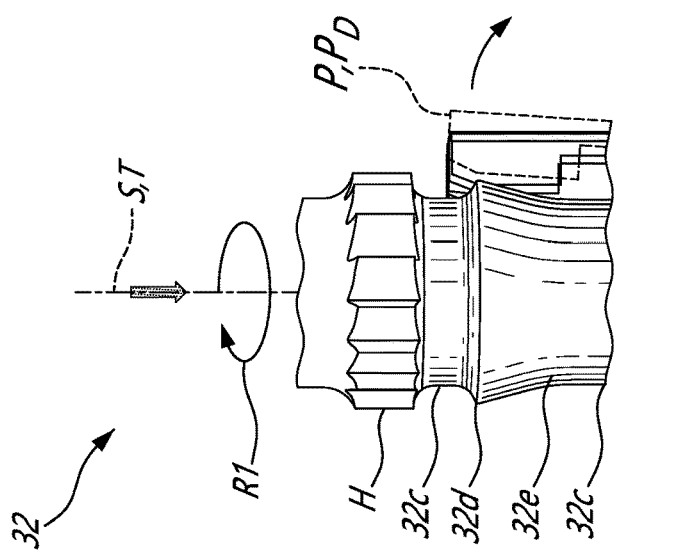
FIG. 9 is a close-up view of a ratchet pawl of the locking member shown biased outwardly by a shoulder of the service tube.

Depending on the embodiment, the anti-loosening structure of the service tube assembly 30 may also comprise a fastener 38 releasably holding the locking member 36 against the mating part 34, as is the case in the illustrated exemplary embodiments. Indeed, although it is contemplated that the locking member 36 could be integral to the mating part 34 or be permanently affixed thereto, the locking member 36 can advantageously be fastened to the mating part 34 so as to be easily removable from the mating part 34 to facilitate removal of the service tube 32 from the mating part 34 or for replacement of the locking member 36 in case of wear that may affect the reliability of the engagement. The locking member 36 thus has a base 36a adapted to be seated onto the mating part 34 and defining a bore 36b adapted to receive the fastener 38. The engagement between the locking member 36 and the mating part 34 may be located radially outward of the engagement between the locking member 36 and the service tube 32 relative to the axis A. The pawl P may thus be located radially between the fastener 38 and the inner duct wall 24 relative to the axis A. The base 36a may for example have a shape complementary to a shape of a seat 34d defined by the outer surface 34b of the mating part 34 proximate to the socket 34a. The seat 34d may have a threaded bore 34e located so as to be aligned with the bore 36b of the base 36a upon the base 36a being received by the seat 34d. The threaded bore 34e may instead be a straight-walled bore provided with a threaded insert of a suitable type, for example a helicoil insert. In some exemplary arrangements, an underside of the base 36a defines a footprint that may be fully received by the seat 34d. Alternatively, as seen in FIG. 5, the footprint of the base 36a may include a plug-like projection 36a' that is offset from a remainder of the footprint. The projection 36a' may thus define the shape suitable for being received by the seat 34d, whereas the remainder of the footprint of the base 36a may rest against the outer surface 34b of the mating part 34. In embodiments, the respective complementary shapes of the base 36a and the seat 34d are arranged such that a sole position of the locking member 36 relative to the mating part 34 is possible, i.e., the locking member 36 and the mating part 34 are indexed relative to one another via the base 36a and the seat 34d. For this purpose, the base 36a may be provided with a locating pin 36a'', for example underneath the projection 36a', to be received in a complementarily sized recess 34d' of the mating part 34, provided for example in the seat 34d. This arrangement can also be described as being anti-rotational, as the respective complementary shapes of the base 36a and the seat 34d hinder angular movement of the locking member 36 relative to the mating part 34, for example about the socket axis S and/or about a fastener socket axis F despite torque being exerted onto the locking member 36 via the service tube 32 as the service tube 32 is rotationally driven into the socket 34a or rotationally springs back therefrom.

As best seen in FIG. 2, the service tube 32 extends longitudinally along a tube axis T from a proximal end 32', i.e., an end defining the tip 32a and the threaded end portion 32b and thus configured to be disposed closest to the mating part 34, to a distal end 32'' opposite to the proximal end 32'. The distal end 32'' is adapted to be operatively connected to a torquing device via which torque can be applied to the service tube 32 to rotate the same about the tube axis T, for example in a direction suitable for threadably engaging the threaded end portion 32b. The hub H is spaced from the threaded end portion 32b in a direction away from the tip 32a, yet is located closer to the tip 32a than to the distal end 32''. In embodiments, the hub H is located between the tip 32a and an axial center of the service tube 32 along the tube axis T, and is closer to the tip 32a than to the axial center, such that the hub H can be said to be part of the proximal end 32'.

In FIG. 3, it can be seen that the socket 34a and the fastener 38 are spaced from one another respectively toward the leading edge 26a and the trailing edge 26b of the strut 26. An inner surface 26c of the strut 26 surrounding the socket 34a bulges as it nears the leading edge 26a, and narrows as it nears the trailing edge 26b. The locking member 36 is sized to fit inward of the inner surface 26c on a side of the socket 34a facing toward the trailing edge 26b. Hence, the pawl P is located on the side of the socket 34a facing toward the trailing edge 26b.

Reference will now be generally made to FIGS. 6 to 12 in which an exemplary hub H and pawl P arrangement is shown in greater detail. The hub H includes a plurality of hub teeth $H_T$ located radially outward of a shank 32c of the service tube 32 relative to the tube axis T and spaced circumferentially from one another. As best seen in FIG. 11, the hub H is provided in this case with 15 hub teeth $H_T$ extending radially outwardly relative to the tube axis T to a respective apex $H_T$a at a 24-degree angle from one another. The hub teeth $H_T$ are thus spaced from one another by a same hub pitch $H_P$ (FIG. 11). In this embodiment, each hub tooth $H_T$ extends from an annular base $H_T$b that extends radially outward from the shank 32c. Each hub tooth $H_T$ defines a first side $H_T1$ and a second side $H_T2$ meeting at a corresponding apex $H_T$a. The first side $H_T1$ extends away from the apex $H_T$a toward the shank 32c and also circumferentially in a first circumferential direction, or first handedness, R1. The second side $H_T2$ extends toward the shank 32c so as to generally face toward a second circumferential direction, or handedness, R2 opposite to the first handedness R1. The second side $H_T2$ may also extend circumferentially in the second handedness R2, in which case a circumferential dimension of the second side $H_T2$ is smaller than that of the first side $H_T1$. The first side $H_T1$ may thus be said to extend toward the shank 32c more gradually than the second side $H_T2$. As such, rotational impingement of the hub H with an object projecting between two consecutive hub teeth $H_T$ may be said to be more lenient in the first handedness R1 and more aggressive in the second handedness R2. Also, it should be noted that the service tube 32 is arranged such that the first handedness R1 corresponds to a tightening direction of the threaded end portion 32b, i.e., a direction suitable for threadably engaging the threaded end portion 32b with the socket 34a. In other embodiments, the hub teeth $H_T$ can be shaped and/or sized differently, and/or provided in different amounts.

The locking member 36 will now be described in more detail. The locking member 36 has a cantilever 36c that extends from a fixed end 36c' that is held relative to the mating part 34, in this case via the base 36a, to a free end 36c''. In this embodiment, the cantilever 36c extends linearly and generally parallel to the socket axis S, although various other shapes are possible. The ratchet pawl P is located at the free end 36c'', and may thus be said to be cantilevered relative to the mating part 34. As will be described in greater detail hereinbelow, the pawl P is held in a resting position $P_R$ (FIGS. 7, 8) radially outward of the socket axis S by the cantilever 36c absent any load exerted onto the pawl P. The cantilever 36c is resiliently deformable so as to reversibly deflect radially outwardly at its free end 36'' relative to the socket axis S, allowing the pawl P to be urged outwardly into a deflected position $P_D$ (FIG. 9) under a radial force, and biasing the pawl P back toward the resting position $P_R$ upon the radial force being withdrawn. The pawl P is cooperable with the hub H such that upon the pawl P being engaged with the hub H (FIGS. 6, 10-12), rotation of the service tube 32 relative to the mating part 34 in the first handedness R1 is allowed by the pawl P, whereas rotation of the service tube 32 relative to the mating part 34 in the second handedness R2 is hindered by the pawl P.

Figure 8:
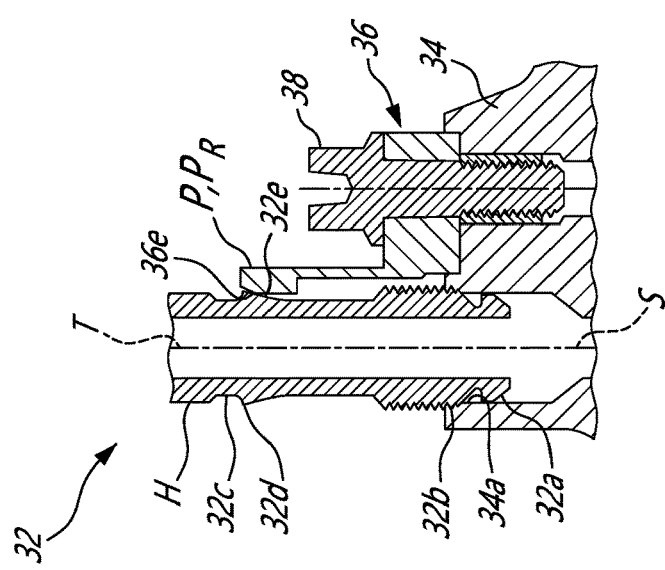
FIG. 8 is a cross-section view of the service tube assembly, shown with the service tube engaged relative to the mating part and disengaged relative to the locking member.

In FIG. 6, the service tube 32 is shown in a seated position relative to the mating part 34, in which the tip 34a is bottomed out in the socket 34a, in this case having reached the sealing surface 34c. The service tube 32, the mating part 34 and the locking member 36 are structured and arranged relative to one another such that upon the service tube 32 being in the seated position, the pawl P is engaged with the hub H. In FIG. 7, the service tube 32 is shown aligned with the socket 34a such that the tube and the socket axes T, S are colinear, with the tip 32a aligned with the outer surface 34b just outside of the socket 34a. In this position of the service tube 32, the pawl P may be in the resting position $P_R$ or in a partially-deflected position between the resting position $P_R$ and the deflected position $P_D$. In FIG. 8, the service tube 32 is still aligned with the socket 34a such that the tube and the socket axes T, S are colinear, the tip 32a is now received by the socket 34a and the threaded end portion 32b is threadably engaged with the socket 34a, albeit partially, e.g, by an amount sufficient for the engagement between the socket 34a and the threaded end portion 32b to align the tube axis T with the socket axis S, for example one turn. In this position of the service tube 32, the pawl P is located between the threaded end portion 32b and the hub H. Hence, the service tube 32, the mating part 34 and the locking member 36 are structured and arranged relative to one another such that the service tube 32 is partially engageable with the mating part 34 without the pawl P being engaged with the hub H. Stated otherwise, the pawl P is engageable with the hub H upon the service tube 32 having been engaged with the mating part 34. As the tip 32a progresses into the socket 34a, the hub H nears the pawl P and eventually engages therewith. Still referring to FIG. 8, the service tube 32 may be provided with a shoulder 32d disposed between the threaded end portion 32b and the hub H. The shoulder 32d is an annular bulge of the service tube 32 that extends radially outward relative to the shank 32c and is sized such that the pawl P is urged outwardly, i.e., away from the resting position $P_R$ and toward the deflected position $P_D$ upon the pawl P engaging with the shoulder 32d as the hub H nears the pawl P. Either one or both of the shoulder 32d and the pawl P may have a leading surface allowing to induce a radial movement of the pawl P relative to the shoulder 32d as the shoulder 32d axially engages the pawl P. The shoulder 32d may include a shoulder leading surface 32e that flares as it extends toward the hub H. Stated otherwise, the shoulder leading surface 32e converges toward the tube axis T as it extends away from the hub H and toward the threaded end portion 32b. The pawl P may be defined by a pad-like projection 36d extending radially relative to the free end 36c" of the cantilever 36c toward the socket axis S. The projection 36d has a top side (i.e., a side facing away from the fixed end 36c' of the cantilever 36c) which may include a pawl leading surface 36e, for instance a chamfer. The projection 36d also has a bottom side (i.e., a side facing toward the fixed end 36c') that may extend to radially inward of a periphery of the shoulder 32d upon the service tube 32 being in the seated position.

As best seen in FIG. 11, the pawl P is disposed radially outward of the socket axis S, and includes at least one pawl tooth $P_T$ facing generally inwardly relative to the socket axis S. In the depicted embodiments, the at least one pawl tooth $P_T$ is a ridge-like formation located onto the projection 36d and extending from the top side to the bottom side. In alternate embodiments, the projection 36d could be omitted, and the at least one pawl tooth $P_T$ could instead be located on the free end 36c" of the cantilever 36c. Each pawl tooth $P_T$ defines a first side $P_T1$ and a second side $P_{T2}$ meeting at a corresponding apex $P_T$a. The second side $P_{T2}$ extends away from the apex $P_T$a toward the projection 36d and also circumferentially in the second handedness R2. The first side $P_{T1}$ extends toward the projection 36d so as to generally face toward the first handedness R1. The first side $P_{T1}$ may also extend circumferentially in the first handedness R1, in which case a circumferential dimension of the first side $P_{T1}$ is smaller than that of the second side $P_{T2}$. The second side $P_{T2}$ may thus be said to extend toward the projection 36d more gradually than the first side $P_{T1}$. The first side $P_{T1}$ of the at least one pawl tooth $P_T$ and the second side $H_{T2}$ of the hub teeth $H_T$ may be complementarily shaped to achieve a desired degree of anti-rotational engagement.

During the installation of the service tube 32, the service tube 32 may be driven in the first handedness R1 into the socket 34a such that the tip 32a compresses the sealing surface 34c to achieve a desired sealing effect. With the tip 32a being adjacent to the sealing surface 34c, a suitable magnitude of compression can be achieved by using a torquing device to apply a torque of a nominal torque value on the service tube 32 about the tube axis T in the first handedness R1. To maintain such compression in absence of the torquing device, the locking device 36 is adapted to hold the service tube 32 in place via anti-rotational engagement of the pawl P relative to the hub H, despite the service tube 32 exerting a reaction torque of a corresponding value in the second handedness R2. For this purpose, the pawl P is structured and arranged such that the at least one pawl tooth $P_T$ is capable of withstanding an engagement force E imparted thereon via a given hub tooth (hereinafter "first hub tooth $H_{TI}$") of the hub teeth $H_T$, the engagement force E having a magnitude and orientation consistent with the reaction torque.

Referring to FIG. 12, upon the suitable magnitude of compression being achieved, the apex $H_T$a of the first hub tooth $H_{TI}$ is located at a nominal angular position α. The pawl P is arranged such that the at least one pawl tooth $P_T$ is engageable with the first hub tooth $H_{TI}$ upon the first hub tooth $H_{TI}$ having reached at least the nominal angular position α in the first handedness R1. The at least one pawl tooth $P_T$ may thus be located either at the nominal angular position, or past the nominal angular position α in the first handedness R1, in which case it follows that the first hub tooth $H_{TI}$ must be displaced past the nominal angular position α in order to be engageable with the at least one pawl tooth $P_T$. A torque of a rated installation torque value greater than the nominal torque value may be applied on the service tube 32 in order to displace the first hub tooth $H_{TI}$ in the first handedness R1 past the at least one pawl tooth $P_T$, for the first hub tooth $H_{TI}$ to engage with the at least one pawl tooth $P_T$ upon release of the service tube 32 from the torquing device. The reaction torque may thus increase up to a value corresponding to the rated installation torque value, and may decrease until engagement of the first hub tooth $H_{TI}$ in case of backlash. Indeed, if the applied torque causes the first hub tooth $H_{TI}$ to be displaced by a distance δ past the angular position of the at least one pawl tooth $P_T$, the first hub tooth $H_{TI}$ has to travel back across the distance δ before it engages with the at least one pawl tooth $P_T$. Such backlash may occur as a result of a spring back effect at the interface between the service tube 32 and the socket 34a, for example between the sealing surface 34c and the tip 32a.

In embodiments, the at least one pawl tooth $P_T$ is frangible by the first hub tooth $H_{TI}$ in the second handedness R2 upon a torque exerted onto the service tube 32 in the second handedness R2 being of a rated release torque value that is greater than the rated installation torque value. Stated otherwise, the anti-rotational engagement of the pawl P and the hub H is overcomable upon applying a torque of the rated release torque value to the service tube 32 in the second handedness R2. The service tube 32 and the locking member 36 may be respectively constructed of a first and a second material, the second material having a rigidity that is less than that of the first material. By this arrangement, the integrity of the hub H is promoted over that of the locking member 36.

The pawl P may have a plurality of pawl teeth $P_T$ that are circumferentially spaced from one another. By providing the pawl P with at least another pawl tooth $P_T$ (i.e., a first pawl tooth $P_{TI}$) in addition to the at least one pawl tooth $P_T$ (i.e., a second pawl tooth $P_{TII}$), the pawl P may be adapted to engage with the hub H upon the first hub tooth $H_{TI}$ being in at least one angular position other than the nominal angular position α. The first pawl tooth $P_{TI}$ and the second pawl tooth $P_{TII}$ are spaced from one another by a pawl pitch (i.e., a first pawl pitch $P_{PI}$) that may be smaller than the hub pitch $H_P$. In such case, should the applied torque cause the first hub tooth $H_{TI}$ to be displaced past the angular position of the second pawl tooth $P_{TII}$ by a distance greater than the first pawl pitch $P_{PI}$ (e.g., a distance corresponding to the hub pitch $H_P$), the first hub tooth $H_{TI}$ would be displaced past the first pawl tooth $P_{TI}$, and the resulting backlash would be limited to a lesser distance as the first pawl tooth $P_{TI}$ would engage the first hub tooth $H_{TI}$ upon release of the service tube 32 from the torquing device.

In this exemplary embodiment, the pawl P has seven pawl teeth $P_{TI}$, $P_{TII}$, $P_{TIII}$, $P_{TIV}$, $P_{TV}$, $P_{TVI}$, $P_{TVII}$ spaced circumferentially and consecutively in the second handedness R2. The second pawl tooth $P_{TII}$ is spaced from the first pawl tooth $P_{T1}$ by the first pawl pitch $P_{PI}$. The third pawl tooth $P_{TIII}$ is spaced from the second pawl tooth $P_{TII}$ by a second pawl pitch $P_{PII}$. The fourth pawl tooth $P_{TVI}$ is spaced from the third pawl tooth $P_{TIII}$ by a third pawl pitch $P_{PIII}$. The fifth pawl tooth $P_{TV}$ is spaced from the fourth pawl tooth $P_{TIV}$ by a fourth pawl pitch $P_{PIV}$. The sixth pawl tooth $P_{TVI}$ is spaced from the fifth pawl tooth $P_{TV}$ by a fifth pawl pitch $P_{PV}$. The seventh pawl tooth $P_{TVII}$ is spaced from the sixth pawl tooth $P_{TVI}$ by a sixth pawl pitch $P_{PVI}$. The first pawl pitch $P_{PI}$ is less than the second pawl pitch $P_{PII}$ and the sixth pawl pitch $P_{PVI}$, but is greater than the third $P_{PIII}$, fourth $P_{PVI}$ and fifth $P_{PV}$ pawl pitches. Other arrangements are possible.

In other embodiments, at least some of the pawl teeth $P_T$ are spaced from one another by a pawl pitch corresponding to the hub pitch $H_P$. This arrangement may allow to distribute the engagement force E on the corresponding pawl teeth $P_T$. In this exemplary embodiment, the pawl teeth $P_T$ are spaced from one another such that the hub H is engageable with the pawl P via a sole hub tooth $H_T$ regardless of the angular position of the service tube 32. It will also be noted that the pawl P is formed of a plurality of pawl sectors $P_{S1}$, $P_{S2}$, $P_{S3}$ each having one or more of the pawl teeth $P_T$. Namely, a first pawl sector Psi has the first and second pawl teeth $P_{TI}$, $P_{TII}$. A second pawl sector $P_{S2}$ has the third, fourth and fifth pawl teeth $P_{TIII}$, $P_{TIV}$, $P_{TV}$. A third pawl sector $P_{S3}$ has the sixth and seventh pawl teeth $P_{TVI}$, $P_{TVII}$. The locking member 36 is provided with a plurality of individual cantilevers 36c (which may be referred to as fingers together forming the cantilever 36c) extending side by side from the base 36a. The pawl sectors $P_{S1}$, $P_{S2}$, $P_{S3}$ are respectively located at the free end 36" of a corresponding one of the cantilevers 36c. The locking member 36 is arranged such that the pawl sectors $P_{S1}$, $P_{S2}$, $P_{S3}$ maintain contact with the hub H regardless of the angular position of the service tube 32. This arrangement may mitigate dynamic issues such as wear-inducing vibration at the interface between the pawl P and the hub H. Here, when a given pawl tooth $P_T$ (e.g. the second pawl tooth $P_{TII}$) is anti-rotationally engaged with a given hub tooth $H_T$, a corresponding pawl sector $P_{S1}$, $P_{S2}$, $P_{S3}$ (e.g., the first pawl sector Psi) contacts the hub H from the resting position $P_R$, whereas a remainder of the pawl sectors $P_{S1}$, $P_{S2}$, $P_{S3}$ (e.g., the second and third pawl sectors $P_{S2}$, $P_{S3}$) are urged by the hub H away from the resting position $P_R$ to respective positions (e.g., $P_{S2}'$, $P_{S3}'$) between the resting position $P_R$ and the deflected position $P_D$. In other embodiments, all of the pawl sectors $P_{S1}$, $P_{S2}$, $P_{S3}$ may be urged by the hub H away from the resting position $P_R$ regardless of the angular position of the service tube 32.

Figure 14:
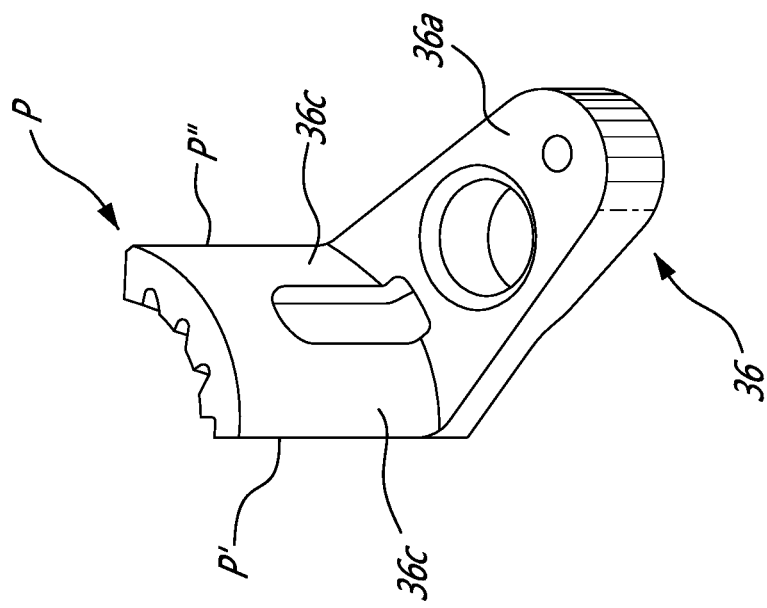
FIG. 14 is an isometric view of a locking member of a service tube assembly according to another embodiment.
Figure 13:
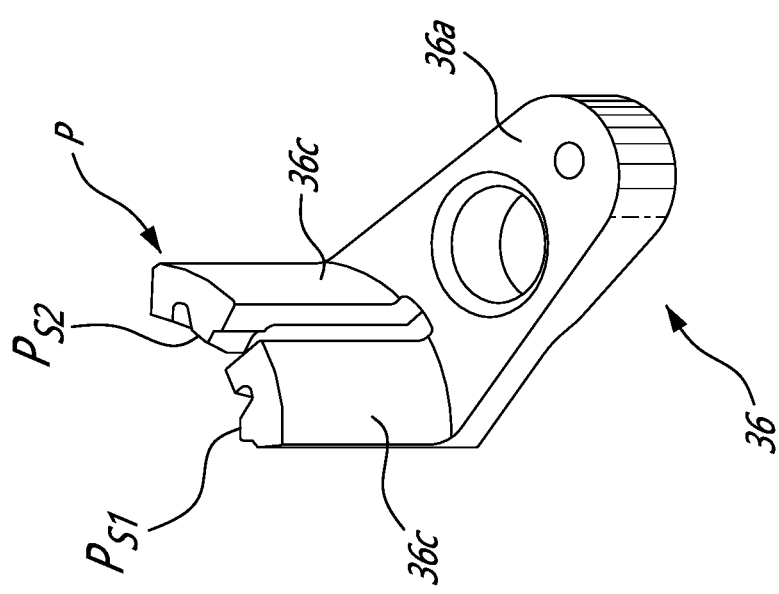
FIG. 13 is an isometric view of a locking member of a service tube assembly according to another embodiment.
Figure 16:
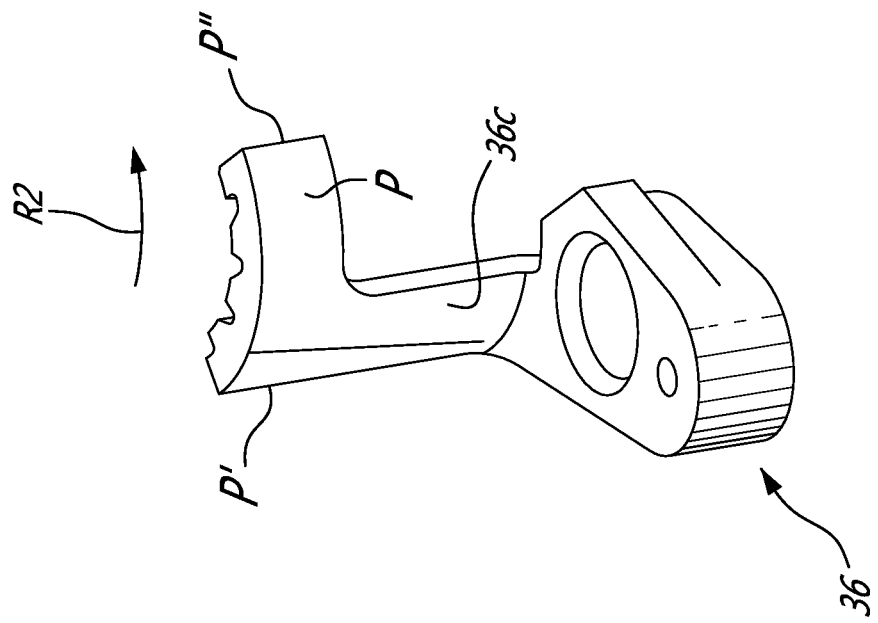
FIG. 16 is a perspective view of a locking member of a service tube assembly according to a still further embodiment.
Figure 15:
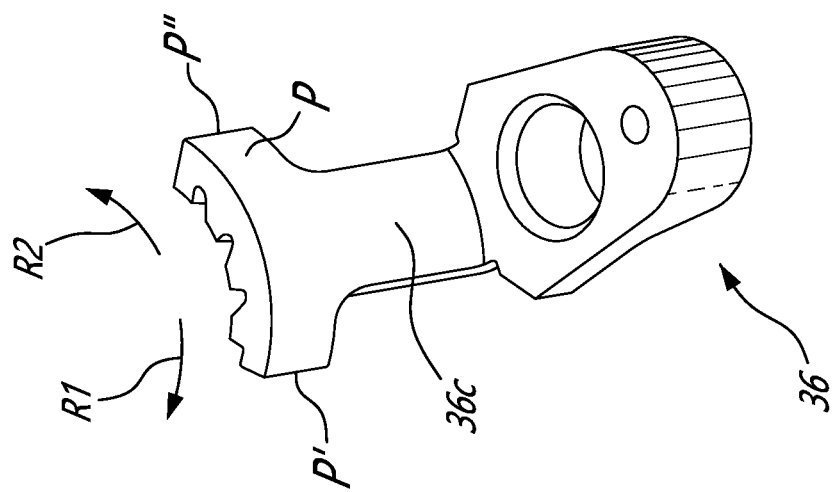
FIG. 15 is a perspective view of a locking member of a service tube assembly according to a further embodiment.

With reference to FIGS. 13 to 16, exemplary alternate embodiments of the locking member 36 will now be described. In FIG. 13, there is shown a locking member 36 that is provided with a pair of individual cantilevers 36c (or fingers) each terminating into a pawl sector $P_{S1}$, $P_{S2}$. Each pawl sector $P_{S1}$, $P_{S2}$ has two pawl teeth $P_T$. In FIG. 14, there is shown a locking member 36 that has a pair of individual cantilevers 36c respectively terminating into opposite ends P', P" of an integral pawl P (i.e., a pawl P having a sole sector). The pawl P is provided with four pawl teeth $P_T$. In FIG. 15, there is shown a locking member 36 that has a sole cantilever 36c terminating into an integral pawl P. From the free end 26c" of the cantilever 36c, the pawl P extends arcuately in the first handedness R1 to its first end P', and in the second handedness R2 to its second end P'''. In FIG. 16, there is shown a locking member 36 that has a sole cantilever 36c terminating into an integral pawl P at one of its ends P', P'''. In this embodiment, the pawl P extends arcuately in the second handedness R2 from its first end P' supported by the cantilever 36c to its second end P''' that is free relative to the cantilever 36c. It is contemplated that in other embodiments, the second end P''' could be supported by the cantilever 36c, whereas the first end P' could be free relative to the cantilever 36c.

All of the above described alternative embodiments provide for a method of assembling a service tube to an engine component, wherein the method comprises: threadably engaging the service tube with a socket of the engine component, including rotating the service tube in a first handedness relative to the engine component; and locking the service tube against rotation in a second handedness opposite the first handedness relative to the engine component, including catching a ratchet hub of the service tube with a ratchet pawl cantilevered with respect to the engine component away from the socket. The threadably engaging of the service tube can include applying a torque to the service tube corresponding to a rated installation torque value to ratchet the ratchet hub across a pawl tooth of the ratchet pawl. The threadably engaging of the service tube can include biasing the ratchet pawl away from a longitudinal axis of the service tube before the locking of the service tube. The method can also comprise fastening the ratchet pawl relative to the engine component prior to the threadably engaging of the service tube with the socket.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, For example, while the service tube has been described as a service tube for providing oil to a bearing, it is understood that the service tube could be mounted to other engine components or mating parts. For instance, the service tube may be used to transport air or oil from between a sump and an external conduit, such as an oil supply or scavenge line, or sump pressurization or vent line. Also, it is understood that a wide variety of mechanical fasteners may be used to suitably secure the locking member against the mating part. Yet further modifications could be implemented by a person of ordinary skill in the art in view of the present disclosure, which modifications would be within the scope of the present technology.

The invention claimed is:

1. A service tube assembly for an aircraft engine, comprising:
   a service tube having a threaded end portion and a ratchet hub spaced from the threaded end portion;
   a mating part having a socket threadably engaged with the threaded end portion of the service tube; and
   a locking member having a cantilever extending from a fixed end held relative to the mating part proximate to the socket to a free end spaced away from the socket, and a ratchet pawl located at the free end, the ratchet pawl anti-rotationally engaged with the ratchet hub.

2. The service tube assembly as defined in claim 1, wherein the ratchet pawl has a first pawl tooth and a second pawl tooth spaced from one another circumferentially relative to the ratchet hub.

3. The service tube assembly as defined in claim 2, wherein the ratchet hub has a plurality of hub teeth spaced circumferentially from one another so as to define a hub pitch, and the first pawl tooth and the second pawl tooth define a pawl pitch that is less than the hub pitch.

4. The service tube assembly as defined in claim 1, wherein anti-rotational engagement of the ratchet pawl allows rotation of the service tube in a first handedness and hinders rotation of the service tube in a second handedness opposite to the first handedness, the anti-rotational engagement being overcomable upon applying a torque of a rated release torque value to the service tube in the second handedness.

5. The service tube assembly as defined in claim 1, wherein the service tube includes a shoulder located between the threaded end portion and the ratchet hub, and the ratchet pawl extends to radially inward of a periphery of the shoulder as the ratchet pawl anti-rotationally engages with the ratchet hub.

6. The service tube assembly as defined in claim 5, wherein the service tube includes a leading surface extending from the shoulder and converging in a direction toward the threaded end portion.

7. The service tube assembly as defined in claim 1, wherein the locking member has a base located at the fixed end and disposed onto the mating part next to the socket, and the service tube assembly further comprises a mechanical fastener releasably holding the locking member against the mating part via the base.

8. The service tube assembly as defined in claim 7, wherein the mating part has a seat located next to the socket, the seat shaped relative to the base such that the base is receivable by the seat in anti-rotational engagement.

9. The service tube assembly as defined in claim 1, wherein the cantilever is formed of a plurality of fingers.

10. The service tube assembly as defined in claim 9, wherein the ratchet pawl is formed of a plurality of pawl sectors including a first pawl sector and a second pawl sector respectively connected to a first finger and a second finger of the plurality of fingers.

11. The service tube assembly as defined in claim 1, wherein the ratchet pawl extends arcuately away from the free end of the cantilever.

12. A turbine exhaust case comprising:
   an outer duct wall and an inner duct wall defining therebetween an annular gas path about an engine axis;
   a strut extending across the annular gas path;
   a service tube extending through the strut, the service tube having a threaded inner end portion and a ratchet hub spaced from the threaded inner end portion;
   a bearing housing disposed radially inwardly from the inner duct wall, the bearing housing having a socket, the threaded inner end portion of the service tube threadably engaged with the socket, the bearing housing further having a seat located next to the socket;
   a locking member having a base disposed on the seat, a cantilever extending from a fixed end fixed relative to the base to a free end spaced away from the base, and a ratchet pawl located at the free end, the ratchet pawl anti-rotationally engaged with the ratchet hub; and
   a threaded fastener releasably holding the base against the seat.

13. The turbine exhaust case defined in claim 12, wherein the locking member and the threaded fastener are located radially inward of the inner duct wall relative to the engine axis.

14. The turbine exhaust case defined in claim 13, wherein the ratchet pawl is located radially between the threaded fastener and the inner duct wall relative to the engine axis.

15. The turbine exhaust case defined in claim 12, wherein the strut has a leading edge and a trailing edge opposite to the leading edge, the socket and the threaded fastener spaced from one another respectively toward the leading edge and the trailing edge.

16. The turbine exhaust case defined in claim 15, wherein the ratchet pawl is located on a side of the socket facing toward the trailing edge.

17. A method of assembling a service tube to an engine component, the method comprising:
   threadably engaging the service tube with a socket of the engine component, including rotating the service tube in a first handedness relative to the engine component; and
   locking the service tube against rotation in a second handedness opposite the first handedness relative to the engine component, including catching a ratchet hub of the service tube with a ratchet pawl cantilevered with respect to the engine component away from the socket.

18. The method defined in claim 17, wherein the threadably engaging of the service tube includes applying a torque to the service tube corresponding to a rated installation torque value to ratchet the ratchet hub across a pawl tooth of the ratchet pawl.

19. The method defined in claim 18, comprising fastening the ratchet pawl relative to the engine component prior to the threadably engaging of the service tube with the socket.

20. The method defined in claim 17, wherein the threadably engaging of the service tube includes biasing the ratchet pawl away from a longitudinal axis of the service tube before the locking of the service tube.

* * * * *